Sept. 16, 1941.  J. W. COGHLAN  2,256,016
SAW CLAMP AND FILE GUIDE
Filed Dec. 1, 1938   2 Sheets-Sheet 1
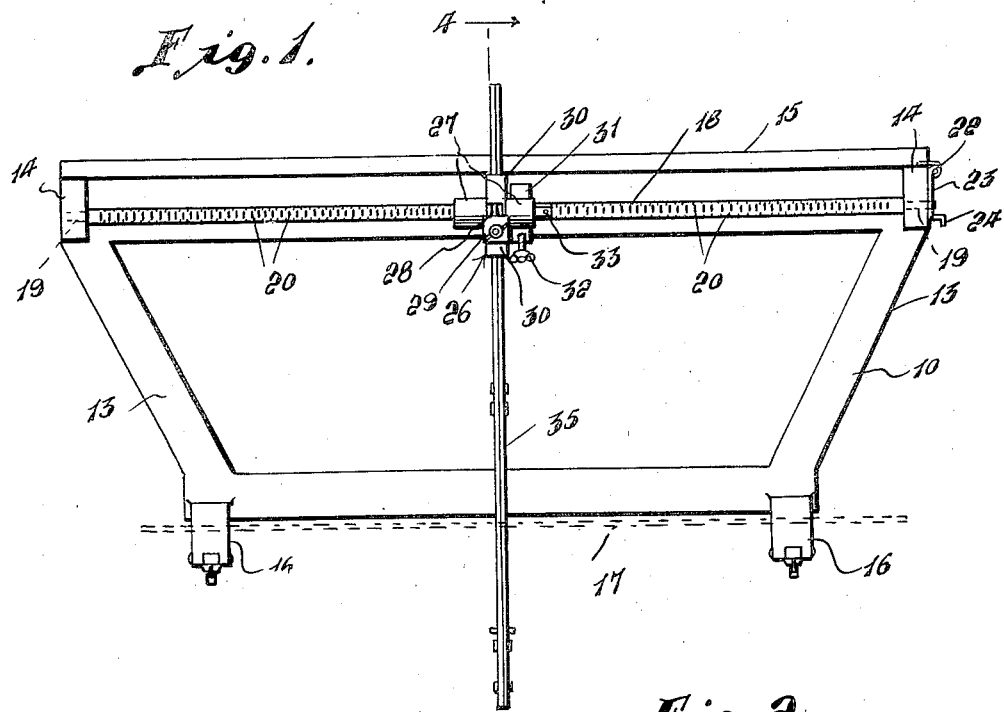
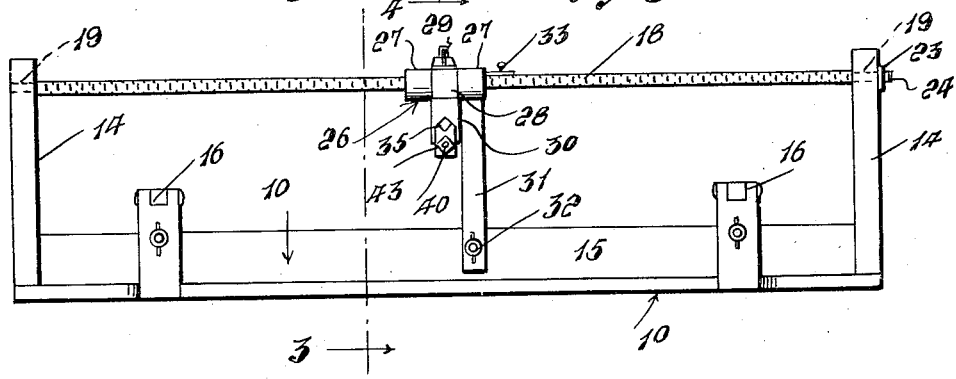
Inventor
J. W. Coghlan
Attorney Sept. 16, 1941. J. W. COGHLAN 2,256,016
SAW CLAMP AND FILE GUIDE
Filed Dec. 1, 1938 2 Sheets-Sheet 2
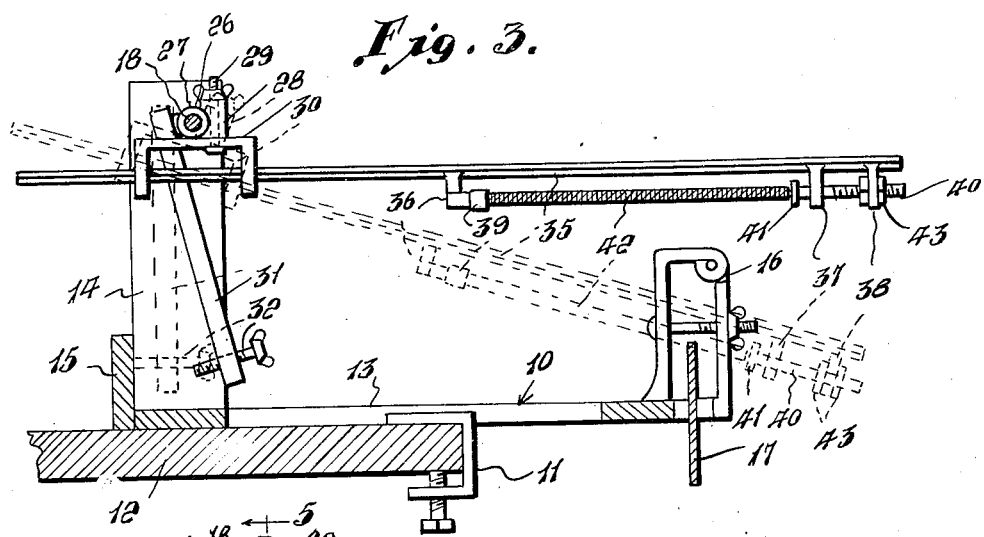
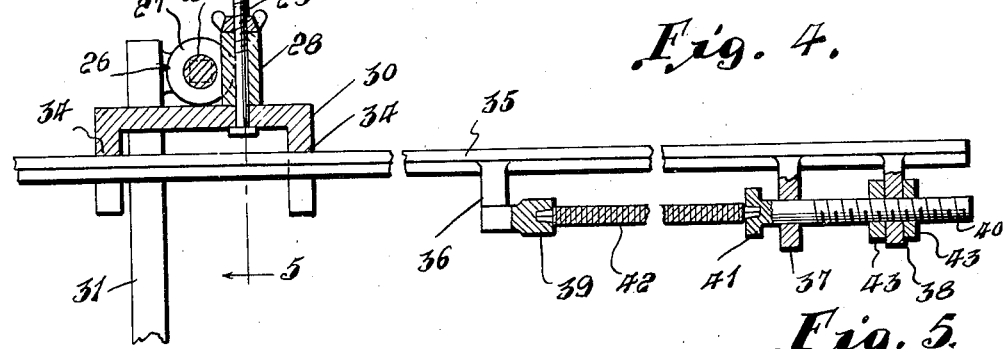
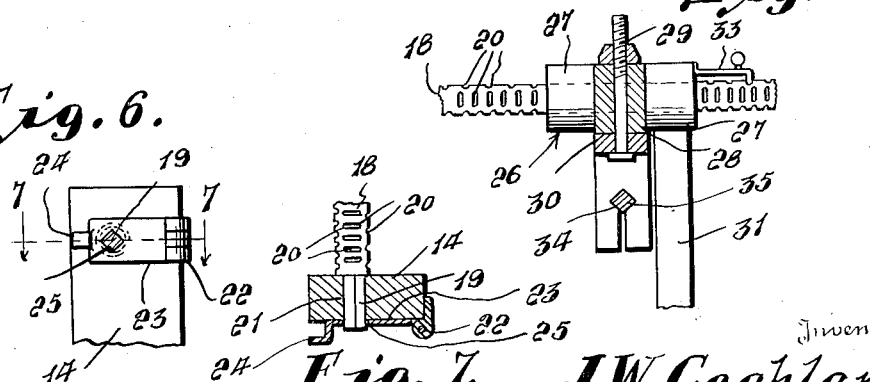
Inventor
J. W. Coghlan Patented Sept. 16, 1941

2,256,016

UNITED STATES PATENT OFFICE 2,256,016

SAW CLAMP AND FILE GUIDE

Jacob W. Coghlan, Walsenburg, Colo.

Application December 1, 1938, Serial No. 243,456

1 Claim. (Cl. 76—31)

This invention relates to a device for removably supporting a saw and file and for adjustably positioning the file relatively to the teeth of the saw.

It is an aim of this invention to provide an improved filing device for saws containing means for adjustably positioning the file to be properly centered between each of the teeth of the saw and to be positioned at the proper angle relatively to the saw.

Still a further object of the invention, is to provide a device having means adapting it for use with saws having teeth of varying sizes and varying depths, so that each tooth of a saw will be sharpened to the same depth and at the same angle to maintain the proper bevel on the teeth and the proper distance between the teeth.

The advantage of this device resides in the fact that it may be adjusted to correspond to various makes and sizes of saws so that a uniform sharpening operation will result automatically, regardless of the uniformity of the manual operation necessary to filing the teeth.

Other objects and advantages of the invention will hereinafter become more fully apparent from the following description of the drawings which illustrate a preferred form of the invention, and wherein:

Figure 1 is a top plan view of the device,

Figure 2 is a front elevational view of the same,

Figure 3 is a vertical sectional view taken on the line 3—3 of Figure 2,

Figure 4 is a vertical sectional view taken on the line 4—4 of Figure 1,

Figure 5 is a vertical sectional view taken on the line 5—5 of Figure 4,

Figure 6 is a fragmentary end view in elevation of one of the frame uprights, and Figure 7 is a horizontal sectional view taken the line 7—7 of Figure 6.

Referring more particularly to the drawings wherein like reference characters designate like or corresponding parts throughout the different views, 10 designates generally the frame of the tool, which is provided with one or more clamping members 11 to secure the device to a bench, table or other suitable support 12. Frame 10, includes the base portion 13, the uprights 14, at opposite sides of the rear end thereof, and the back bar 15 which extends along the rear edge of the base 13 between the uprights 14, for a purpose which will be hereinafter more fully explained.

Frame 10 at its forward converging end is provided with the spaced clamping members 16 adapted to removably support a saw 17 with its toothed edge upwardly.

A rod 18 has its reduced end 19 journaled in the free ends of the uprights 14 and rotatably mounted thereby. Rod 18 is provided with four rows of notches 20, which extend substantially the length of the rod, the spaces between the notches of the different rows varying to correspond to the distance between the teeth of different types or makes of saws, for a purpose which will hereinafter be more fully described.

As best seen in Figures 6 and 7, the ends 19 are polygonal shaped in cross section and the openings 21 in the uprights 14 in which these ends are journaled, are sufficiently large to permit rods 18 to normally be revolved readily. To one of the uprights 14 is secured a hinge designated generally 22, and having the portion 23 adapted to swing outwardly from the outer side of the upright 14, to which it is connected. Portion 23 at its free end is provided with an outwardly offset portion forming the handle 24, and with a polygonal shaped opening, adapted to align with the opening 21 when the portion 23 is in engagement with upright 14 to receive the end of the member 19, as best seen in Figure 7, to hold rod 18 rigidly in the uprights 14.

A file guide designated generally 26, and comprising the corresponding sleeve sections 27 which are slidably mounted on the rod 18, and the sleeve section 28, which is rigidly secured to and connects the sections 27, and which is disposed at right angles thereto, to receive a nut and bolt 29 by means of which an inverted U-shaped member 30 is removably mounted on the sleeve 28 beneath the rod 18. The file guide 26, also includes the arm 31 which is secured to one of the sleeves 27 and depends downwardly therefrom, and is provided with a set screw 32 in its free end adapted to engage the inner side of the back wall 15. Guide 26 is also provided with a spring latch member 33 secured to the outer end of one of the sleeve sections 27 and provided with a downturned free end adapted to engage in the notches 20 to retain the guide 26 against longitudinal movement relatively to rod 18 when latch 33 is in position.

The downturned ends of the inverted U-shaped member 30, are provided with the polygonal shaped openings 34 in which one end of a rod 35, which corresponds in cross sectional shape to the openings 34, is reciprocally mounted. The opposite end of the rod 35 is provided with the three depending spaced lugs 36, 37 and 38, the lug 36 being provided with a socket member 39 extending toward the lugs 37 and 38, and the lugs 37 and 38 being apertured to receive the threaded shank 40 of the socket member 41 which projects toward the socket 39 to coact therewith to engage the opposite restricted ends of a file 42, for removably supporting the file. The file 42 is releasably supported by the socket member 41 which is provided with the nuts 43 engaging the threaded shank 40 and the opposite side of the lug 38, to adjust the socket 41 relatively to the supporting lugs 37 and 38.

From the foregoing it will be seen, that any desired type of file 42 may be removably clamped between the members 39 and 41, and the rod 18 adjusted by means of hinge 22, as heretofore explained, so that the uppermost row of notches 20 will correspond to the space between the teeth of the saw 17 which is held by the clamps 16, after which the guide 26 will be moved to the left as seen in Figures 1 and 2, while holding the spring latch 33 in a raised position, until rod 35 can be swung downwardly to cause the file 42 to engage between the first two teeth of the saw. Latch 33 is then released to engage the notch 20 over which it is positioned, to prevent longitudinal movement of the guide 26, and the set screw 32 is adjusted so that it is just slightly spaced from the wall 15, after which rod 35 is reciprocated in its guide 26 to sharpen the adjacent sides of the two teeth. When these two teeth have been ground to the proper bevel, the set screw 32 should be engaging wall 15 to prevent the forward end of the rod 35 from moving downwardly, and of course in sharpening the first teeth set screw 32 will probably have to be adjusted several times before the proper bevel on these teeth can be obtained. Latch 33 is then raised and guide 26 moved to the left the distance of one notch, and rod 35, which has been raised during this operation, is again lowered and reciprocated until the file 42 has sharpened the next pair of teeth to the point where the set screw 32 has contacted the wall 15. This operation is successively repeated until all of the teeth have been sharpened, and as heretofore explained, the bevels on all of the teeth will be uniform when the operation has been completed.

Should the next saw to be sharpened be of a different type and size, another type of file 42 may be clamped to the rod 35, and the rod 18 may be released and turned until a row of notches 20 spaced to correspond to the space between the teeth of this saw, is upright so that the new saw may be sharpened in the same manner as heretofore described.

Various modifications and changes in the construction and arrangement of the parts forming the invention may obviously be made and are contemplated, and the right is reserved to make such variations and changes as do not depart from the spirit and scope of the invention as hereinafter defined by the appended claim.

I claim as my invention:

In a device of the class described a frame having clamping means adapted to removably support a saw, a rod rotatably mounted in said frame and provided with a plurality of rows of notches, a yoke shaped member loosely mounted on said rod, a bar slidably mounted in said yoke and adapted to removably support a file, means carried by said yoke to successively engage a row of said notches to position the file in each of the saw teeth, and locking means releasably engaging one end of said rod for selectively positioning the rows of notches relatively to said aforementioned means, an arm depending from said yoke and provided with a set screw at its free end to engage a portion of said frame for limiting the vertical swinging movement of the file supporting rod in one direction relatively to the saw.

JACOB W. COGHLAN.